(12) United States Patent
Shindo et al.

(10) Patent No.: US 8,039,529 B2
(45) Date of Patent: Oct. 18, 2011

(54) METHOD OF MANUFACTURING A GOLF BALL

(75) Inventors: Jun Shindo, Chichibu (JP); Takahiro Hayashi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 441 days.

(21) Appl. No.: 11/937,768

(22) Filed: Nov. 9, 2007

(65) Prior Publication Data

US 2009/0124757 A1    May 14, 2009

(51) Int. Cl.
*A63B 37/00* (2006.01)
*A63B 37/06* (2006.01)
*C08L 9/00* (2006.01)

(52) U.S. Cl. ......... 523/351; 524/432; 525/193; 525/274

(58) Field of Classification Search .................. None
See application file for complete search history.

(56) References Cited

U.S. PATENT DOCUMENTS

| | | | |
|---|---|---|---|
| 5,093,402 A * | 3/1992 | Hashimoto et al. | 524/398 |
| 6,465,546 B1 * | 10/2002 | Jackson et al. | 523/351 |
| 6,602,941 B2 | 8/2003 | Higuchi et al. | |
| 6,634,961 B2 | 10/2003 | Higuchi et al. | |
| 6,642,314 B2 | 11/2003 | Sone et al. | |
| 6,695,716 B2 | 2/2004 | Higuchi et al. | |
| 6,712,715 B2 | 3/2004 | Higuchi et al. | |
| 6,786,836 B2 | 9/2004 | Higuchi et al. | |
| 6,921,345 B2 | 7/2005 | Higuchi et al. | |
| 2003/0144083 A1 * | 7/2003 | Kataoka | 473/367 |
| 2004/0033847 A1 * | 2/2004 | Higuchi et al. | 473/371 |
| 2005/0137031 A1 * | 6/2005 | Kataoka et al. | 473/371 |
| 2005/0256237 A1 * | 11/2005 | Voorheis et al. | 524/394 |
| 2006/0019771 A1 | 1/2006 | Kennedy, III et al. | |
| 2007/0202965 A1 * | 8/2007 | Shindo et al. | 473/351 |

FOREIGN PATENT DOCUMENTS

| | | |
|---|---|---|
| JP | 04319373 | * 11/1992 |
| JP | 2007-222196 | 9/2007 |

OTHER PUBLICATIONS

Machine Transalation of JP2007222196; no date.*
Pasqua "Masterbatch for Use in Golf Balls" Research Disclosure 38641; Jun. 1996.*
Tadmor ; Principles of Polymer Processing, 1979; p. 438.*

* cited by examiner

*Primary Examiner* — David Buttner
(74) *Attorney, Agent, or Firm* — Sughrue Mion, PLLC

(57) ABSTRACT

The present invention relates to an industrially beneficial method of manufacturing golf balls which includes the steps of pre-preparing a masterbatch of an unsaturated carboxylic acid and/or a metal salt thereof by mixing an unsaturated carboxylic acid and/or a metal salt thereof with a rubber material, preparing a rubber composition that contains the rubber material by using the masterbatch, and employing a material obtained by molding the rubber composition under heat as a golf ball component. The masterbatch is composed of:

(A) from 20 to 100 wt % of a modified polybutadiene obtained by a modification reaction wherein a polybutadiene having a vinyl content of from 0 to 2%, a cis-1,4 bond content of at least 80% and an active end is modified at the active end with at least one type of alkoxysilane compound, and (B) from 80 to 0 wt % of a diene rubber other than ingredient A, such that ingredients A and B are included in a combined amount of 100 wt %, and (C) an unsaturated carboxylic acid and/or a metal salt thereof.

7 Claims, No Drawings

METHOD OF MANUFACTURING A GOLF BALL

BACKGROUND OF THE INVENTION

The present invention relates to a method of manufacturing a golf ball in which a material molded under heat from a rubber composition serves as a ball component. More specifically, the invention relates to a golf ball manufacturing method which includes the step of preparing a masterbatch of an unsaturated carboxylic acid and/or a metal salt thereof.

Many golf balls that use rubber compositions containing polybutadiene polymerized with a rare-earth catalyst have hitherto been described in the art. Such golf balls axe disclosed in, for example, U.S. Pat. Nos. 6,695,716, 6,712,715, 6,786,836, 6,921,345, 6,634,961 and 6,602,941 (Patent Documents 1 to 6). However, there remains room for further improvement in the rebound performance of such golf balls. Moreover, sufficient performance has yet to be achieved as well in terms of manufacturability.

U.S. Pat. No. 6,642,314 (Patent Document 7) describes the use of an alkoxysilyl group-bearing compound-modified polybutadiene as a rubber composition for golf balls. JP-A 2007-222196 (Patent Document 8) discloses a polybutadiene obtained by additionally subjecting the modified polybutadiene of Patent Document 7 to a condensation reaction. However, in all of the above-mentioned prior art, there remains room for improvement in manufacturability and in the durability and rebound of the resulting golf balls.

Patent Document 1: U.S. Pat. No. 6,695,716
Patent Document 2: U.S. Pat. No. 6,712,715
Patent Document 3: U.S. Pat. No. 6,786,836
Patent Document 4: U.S. Pat. No. 6,921,345
Patent Document 5: U.S. Pat. No. 6,634,961
Patent Document 6: U.S. Pat. No. 6,602,941
Patent Document 7: U.S. Pat. No. 6,642,314
Patent Document 8: JP-A 2007-222196

Moreover, it is regarded as desirable for the durability and rebound of a golf ball to use, as the metal salt of an unsaturated carboxylic acid typically employed as the co-crosslinking agent in a rubber composition for golf balls, a compound such as zinc methacrylate or zinc acrylate. This zinc methacrylate or zinc acrylate is generally included in a large amount with respect to rubber ingredients such as polybutadiene. However, when the various ingredients are masticated to form a rubber composition, because the zinc methacrylate and zinc acrylate are in the form of a fine powder, a considerable amount of the powder scatters or sticks to the roll mill or other kneading apparatus, greatly interfering with the masticating operation.

Moreover, because these compounds readily form aggregates within the composition and have a poor dispersibility, the unsaturated carboxylic acid zinc salt included in the composition is not effectively utilized, which may lower the resilience and make a constant hardness impossible to achieve.

One commonly used method for preventing the metal salts of unsaturated carboxylic acids from sticking to the kneading apparatus is to employ the metal salt of a higher fatty acid as a lubricant. However, such compounds are ineffective unless the mastication temperature is set to a high temperature of about 100° C. Unfortunately, scorching occurs at high temperatures.

In JP 3178857 (Patent Document 9), an α,β-ethylenically unsaturated carboxylic acid metal salt suspended in an aliphatic hydrocarbon solvent is mixed with a polymer solution to form a rubber composition. However, in this method, following liquid mixture, the solvent must be removed.

JP 2720541 (Patent Document 10) describes the use of a rubber composition prepared by first mixing and dispersing the metal salt of an unsaturated carboxylic acid in liquid rubber, followed by mastication. However, the liquid rubber used is thought to lower the rebound of the golf balls obtained.

To resolve the above problems, JP-A 2004-105680 (Patent Document 11) discloses art in which a metal salt of an unsaturated carboxylic acid is incorporated as a co-crosslinking agent into a rubber composition after first being mixed with and dispersed in a solid rubber such as 1,4-polybutadiene.

However, in the molded and vulcanized materials obtained by the foregoing art, there remains substantial room for improvement in resilience and durability.

Patent Document 9: JP 3178857
Patent Document 10: JP 2720541
Patent Document 11: JP-A 2004-105680

SUMMARY OF THE INVENTION

It is therefore an object of the present invention to provide a method for manufacturing golf balls which employs a masterbatch of an unsaturated carboxylic acid and/or a metal salt thereof prepared using an improved polybutadiene rubber so as to enhance the dispersibility of the unsaturated carboxylic acid and/or metal salt thereof in a rubber composition for golf balls, and is thereby able to produce a molded and vulcanized material of excellent resilience and durability.

Accordingly, the invention provides the following method of manufacturing golf balls.

[1] A method of manufacturing a golf ball, comprising the steps of pre-preparing a masterbatch of an unsaturated carboxylic acid and/or a metal salt thereof by mixing an unsaturated carboxylic acid and/or a metal salt thereof with a rubber material, preparing a rubber composition which includes the rubber material by using the masterbatch, and employing a material obtained by molding the rubber composition under heat as a golf ball component, wherein the masterbatch comprises:

(A) from 20 to 100 wt % of a modified polybutadiene obtained by a modification reaction wherein a polybutadiene having a vinyl content of from 0 to 2%, a cis-1,4 bond content of at least 80% and an active end is modified at the active end with at least one type of alkoxysilane compound, and (B) from 80 to 0 wt % of a diene rubber other than ingredient A, such that ingredients A and B are included in a combined amount of 100 wt %, and (C) an unsaturated carboxylic acid and/or a metal salt thereof.

[2] The golf ball manufacturing method of [1], wherein ingredient C is included in the masterbatch of an unsaturated carboxylic acid and/or a metal salt thereof in an amount of at least 10 parts by weight per 100 parts by weight of rubber ingredients A and B.

[3] The golf ball manufacturing method of [1], wherein the rubber composition further comprises, per 100 parts by weight of rubber ingredients therein:

(D) from 5 to 80 parts by weight of an inorganic filler, and
(E) from 0.1 to 10 parts by weight of an organic peroxide.

[4] The golf ball manufacturing method of [1,] wherein the alkoxysilane compound has an epoxy group on the molecule.

[5] The golf ball manufacturing method of [1], wherein an organotin compound and/or an organotitanium compound is added as a condensation accelerator during and/or following completion of a step in which the polybutadiene modification reaction is carried out.

[6] The golf ball manufacturing method of [1], wherein the polybutadiene used to prepare ingredient A is polymerized using a rare-earth element-containing catalyst system.

[7] The golf ball manufacturing method of [5], wherein the condensation accelerator is a tin carboxylate and/or a titanium alkoxide.

[8] The golf ball manufacturing method of [1,] wherein the rubber composition further comprises an organosulfur compound.

[9] The golf ball manufacturing method of [1], wherein the masterbatch containing ingredients A, B and C accounts for less than 80 wt % of the overall rubber composition.

Hence, the method of manufacturing golf balls according to the invention makes use of the modified polybutadiene of above ingredient A and the diene rubber of above ingredient B, and moreover uses in the rubber composition a masterbatch of a saturated carboxylic acid and/or a metal salt thereof, which masterbatch is prepared in advance by mixing the saturated carboxylic acid and/or a metal salt thereof of above ingredient C with a rubber material. In this method of manufacture, by employing such a masterbatch which contains a saturated carboxylic acid and/or a metal salt thereof and is obtained using the modified polybutadiene rubber of the invention, the dispersibility of the unsaturated carboxylic acid and/or metal salt thereof is improved, enabling the resilience of the rubber molded material to be further enhanced and also imparting the molded material with an excellent durability.

DETAILED DESCRIPTION OF THE INVENTION

The invention is described more fully below.

In the manufacturing method of the invention, a rubber composition is prepared using a masterbatch of an unsaturated carboxylic acid and/or metal salt thereof. The masterbatch is prepared beforehand by mixing an unsaturated carboxylic acid and/or a metal salt thereof with a rubber material Both of the following are used as the rubber materials in the masterbatch: (A) a modified polybutadiene obtained by a modification reaction wherein a polybutadiene having a vinyl content of from 0 to 2%, a cis-1,4 bond content of at least 80% and an active end is modified at the active end with at least one type of alkoxysilane compound; and (B) a specific amount of a diene rubber other than ingredient A. The alkoxysilane compound may have an epoxy group on the molecule. Moreover, an organotin compound and/or an organotitanium compound may be added as a condensation accelerator during and/or following completion of a step in which the modification reaction is carried out.

The condensation accelerator is typically added after effecting a modification reaction in which the alkoxysilane compound is added to the active end of the polybutadiene and before the condensation reaction. However, it is also possible to add the condensation accelerator prior to addition of the alkoxysilane compound (prior to the modification reaction), then add the alkoxysilane compound and carry out the modification reaction, followed in turn by the condensation reaction.

The catalyst used when polymerizing the polybutadiene prior to the modification reaction is not subject to any particular limitation, although the use of a polymerization catalyst made up of a combination of at least one type of compound from each of the following ingredients X, Y and Z is preferred.

Ingredient X Is a lanthanide series rare-earth compound of an atomic number 57 to 71 metal, or a compound obtained by reacting such a rare-earth compound with a Lewis base. Examples of suitable lanthanide series rare-earth compounds include halides, carboxylates, alcoholates, thioalcoholates, amides, phosphates and phosphates. The Lewis base can be used to form a complex with the lanthanide series rare-earth compound. Illustrative examples include acetylacetone and ketone alcohols.

Ingredient Y is an alumoxane and/or an organoaluminum compound of the formula $AlR^1R^2R^3$ (wherein $R^1$, $R^2$ and $R^3$ are each independently a hydrogen or a hydrocarbon group of 1 to 10 carbons). A plurality of different compounds may be used at the same time.

Preferred alumoxanes include compounds of the structures shown in formulas (I) and (II) below. The alumoxane association complexes described in *Fine Chemical* 23, No. 9, 5 (1994), *J. Am. Chem. Soc.* 115, 4971 (1993), and *J. Am. Chem. Soc.* 117, 6465 (1995) are acceptable.

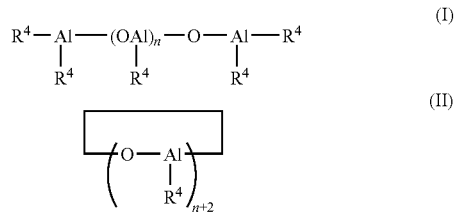

Ingredient Z is a halogen-bearing compound. Preferred examples of halogen-bearing compounds that may be used include aluminum halides of the general formula $AlX_nR_{3-n}$ (wherein X is a halogen; R is a hydrocarbon group of from 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and also silicon tetrachloride, tin tetrachloride, tin trichloride, phosphorus trichloride, titanium tetrachloride, trimethylchlorosilane, methyldichlorosilane, dimethyldichlorosilane and methyltrichlorosilane.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of a solvent, and at a polymerization temperature in a range of preferably −30° C. or above, and more preferably 0° C. or above, but preferably not above +200° C., and more preferably not above +150° C. The polymerization solvent is an inert organic solvent, illustrative examples of which include saturated aliphatic hydrocarbons having from 4 to 10 carbons, such as butane, pentane, hexane and heptane; saturated alicyclic hydrocarbons having from 6 to 20 carbons, such as cyclopentane and cyclohexane; monoolefins such as 1-butene and 2-butene; aromatic hydrocarbons such as benzene, toluene and xylene; and halogenated hydrocarbons such as methylene chloride, chloroform, carbon tetrachloride, trichloroethylene, perchloroethylene, 1,2-dichloroethane, chlorobenzene, bromobenzene and chlorotoluene.

No particular limitation is imposed on the manner in which the polymerization reaction is carried out. That is, the reaction may be carried out using a batch-type reactor, or may be carried out as a continuous reaction using an apparatus such as a multi-stage continuous reactor. When a polymerization solvent is used, the monomer concentration in the solvent is preferably from 5 to 50 wt %, and more preferably from 7 to 35 wt %. To prepare the polymer and to keep the polymer having an active end from being deactivated, care must be taken to prevent to the fullest possible degree compounds having a deactivating action (e.g., oxygen, water, carbon dioxide) from entering into the polymerization system.

In the invention, the polybutadiene having a vinyl content of from 0 to 2% and a cis-1,4 bond content of at least 80% is subjected at the active end thereof to a modification reaction with at least one type of alkoxysilane compound. It is preferable to use for this purpose an alkoxysilane compound having an epoxy group on the molecule. The alkoxysilane compound may be a partial condensation product or a mixture of the alkoxysilane compound with a partial condensation product. "Partial condensation product" refers herein to an alkoxysilane compound in which some, but not all, of the SiOR bonds have been converted to SiOSi bonds by condensation. In the above modification reaction, the polymer used is preferably one in which at least 10% of the polymer chains are "living" chains.

The alkoxysilane compound, although not subject to any particular limitations preferably has at least one epoxy group on the molecule. Illustrative examples include
2-glycidoxyethyltrimethoxysilane,
2-glycidoxyethyltriethoxysilane,
(2-glycidoxyethyl)methyldimethoxysilane,
3-glycidoxypropyltrimethoxysilane,
3-glycidoxypropyltriethoxysilane,
(3-glycidoxypropyl)methyldimethoxysilane,
2-(3,4-epoxycyclohexyl)ethyltrimethoxysilane,
2-(3,4-epoxycyclohexyl)ethyltriethoxysilane and
2-(3,4-epoxycyclohexyl)ethyl(methyl)dimethoxysilane.
Of these, the use of 3-glycidoxypropyltrimethoxysilane and 2-(3,4-epoxycyclohexyl)ethyltrimethoxysilane is preferred.

The alkoxysilane compound is used in a molar ratio with respect to above ingredient X of preferably at least 0.01, more preferably at least 0.1, even more preferably at least 0.5, and most preferably at least 1, but preferably not more than 200, more preferably not more than 150, even more preferably not more than 100, and most preferably not more than 50. If the amount of alkoxysilane compound used is too small, the modification reaction may not proceed to a sufficient degree, the filler may not be adequately dispersed, and the resulting golf ball may have a poor rebound. On the other hand, with the use of too much alkoxysilane compound, the resulting modified polybutadiene may have an excessively high Mooney viscosity, which may make it impossible to achieve the objects of the invention. No particular limitation is imposed on the method for adding the above modifying agent. Examples of suitable methods include adding the modifying agent all at once, adding it in divided portions, and continuous addition. Addition all at once is preferred.

The modification reaction is preferably carried out in a solution (the solution may be one which includes the unreacted monomer used at the time of polymerization). The modification reaction is not subject to any particular limitation, and may be carried out in a batch-type reactor or in a continuous system using such equipment as a multi-stage continuous reactor and an in-line mixer. It is essential that the modification reaction be carried out after completion of the polymerization reaction, but before carrying out various operations required to isolate the polymer, such as solvent removal treatment, water treatment and heat treatment.

The modification reaction may be carried out at the butadiene polymerization temperature. The reaction temperature is preferably at least 20° C., and more preferably at least 40° C., but preferably not more than 100° C., and more preferably not more than 90° C. If the temperature is low, the polymer viscosity may rise. On the other hand, if the temperature is high, the active ends on the polymer tend to lose their activity. The modification reaction time is preferably at least 5 minutes, and more preferably at least 15 minutes, but preferably not more than 5 hours, and more preferably not more than 1 hour.

In the practice of the invention, known antioxidants and known reaction terminators may be optionally added in a step following the introduction of alkoxysilane compound residues onto the active ends of the polymer.

In the present invention, in addition to the above-described modification reaction, a further alkoxysilane compound may be added. To achieve a good rebound when the composition is rendered into a golf ball, it is preferable for this alkoxysilane compound to be an alkoxysilane compound containing a functional group (which compound is referred to below as a "functionalizing agent"). Such addition is a step which follows the above-described introduction of alkoxysilane compound residues onto the active ends of the polymer, and is preferably carried out prior to initiation of the condensation reaction. If such addition is carried out after initiation of the condensation reaction, the functionalizing agent may not uniformly disperse, which may lower the catalyst performance. Addition of the functionalizing agent is carried out preferably after 5 minutes, and more preferably after 15 minutes from initiation of the modification reaction, but preferably before 5 hours, and more preferably before 1 hour from initiation of the modification reaction.

The functionalizing agent substantially does not react directly with the active ends and remains in an unreacted state within the reaction system. Therefore, in the condensation reaction step, it is consumed in the condensation reaction with the alkoxysilane compound residues that have been introduced onto the active ends. Preferred examples of the functionalizing agent include alkoxysilane compounds having at least one functional group selected from among amino groups, imino groups and mercapto groups. The alkoxysilane compound used as a functionalizing agent may be a partial condensation product, or may be a mixture of the alkoxysilane compound with such a partial condensation product.

When a functional group-bearing alkoxysilane compound is used as the functionalizing agent in the method of modification of the present invention, the polymer having an active end reacts with the substantially stoichiometric amount of alkoxysilane compound that has been added to the reaction system, thereby introducing alkoxysilyl groups onto substantially all the chain ends (modification reaction). With the further addition of alkoxysilane compound, alkoxysilane compound residues are introduced in an amount greater than the chemically equivalent amount of active ends.

It is preferable for condensation reactions between alkoxysilyl groups to occur between a (remaining or newly added) free alkoxysilane molecule and an alkoxysilyl group on the end of a polymer chain or, in some cases, between alkoxysilyl groups on the ends of polymer chains; reactions between free alkoxysilane molecules are unnecessary. Therefore, in cases involving the fresh addition of alkoxysilane compound, it is desirable from the standpoint of efficiency for the hydrolyzability of alkoxysilyl groups on the alkoxysilane compound to not exceed the hydrolyzability of alkoxysilyl groups on the ends of the polymer chains. For example, it is advantageous to combine the use of a compound bearing a trimethoxysilyl group, which has a large hydrolyzability, as the alkoxysilane compound employed for reaction with the active ends on the polymer, with the use of a compound containing an alkoxysilyl group of lesser hydrolyzability (e.g., a triethoxysilyl group) as the subsequently added alkoxysilane compound.

The above functional group-bearing alkoxysilane compound which may be employed as the functionalizing agent is used in a molar ratio with respect to above component X of preferably at least 0.01, more preferably at least 0.1, even more preferably at least 0.5, and most preferably at least 1, but preferably not more than 200, more preferably not more than 150, even more preferably not more than 100, and most preferably not more than 50. If the amount of use is too low, the modification reaction may not proceed to a sufficient degree, the filler dispersibility may not sufficiently improve, and the composition may have a poor resilience when rendered into a golf ball. On the other hand, if the amount of use is too high, the Mooney viscosity of the resulting modified polybutadiene may be too high.

In the present invention, it is preferable to use a condensation accelerator in order to accelerate the condensation reaction on the above-described alkoxysilane compound used as the modifying agent (and the functional group-bearing alkoxysilane compound which may be used as the functionalizing agent). The condensation accelerator used here may be added prior to the above modification reaction, although addition after the modification reaction and before initiation of the condensation reaction is preferred. When added before the modification reaction, the condensation accelerator may react directly with active ends, which may prevent alkoxysilyl groups from being introduced onto the active ends. Moreover, when added after initiation of the condensation reaction, the condensation accelerator may not uniformly disperse, as a result of which the catalytic performance may decrease. Addition of the condensation accelerator is carried out preferably after 5 minutes, and more preferably after 15 minutes from initiation of the modification reaction, but preferably before 5 hours, and more preferably before 1 hour from initiation of the modification reaction.

The condensation accelerator is preferably an organotin compound and/or an organotitanium compound. A tin carboxylate and/or a titanium alkoxide are especially preferred.

Specific examples of titanium alkoxides which may be used as the condensation accelerator include tetramethoxytitanium, tetraethoxytitanium, tetra-n-propoxytitanium, tetra-i-propoxytitanium, tetra-n-butoxytitanium, tetra-n-butoxytitanium oligomer, tetra-sec-butoxytitanium, tetra-tert-butoxytitanium, tetra(2-ethylhexyl)titanium, bis(octanedioleate)bis(2-ethylhexyl)titanium, tetra(octanedioleate)titanium, titanium lactate, titanium dipropoxybis(triethanolaminate), titanium dibutoxybis(triethanolaminate), titanium tributoxystearate, titanium tripropoxystearate, titanium tripropoxyacetylacetonate and titanium dipropoxybis(acetylacetonate).

Specific examples of tin carboxylates which may be used as the condensation accelerator include bis(n-octanoate)tin, bis(2-ethylhexanoate)tin, bis(laurate)tin, bis(naphthenate)tin, bis(stearate)tin, bis(oleate)tin, dibutyltin diacetate, dibutyltin di-n-octanoate, dibutyltin di-2-ethylhexanoate, dibutyltin dilaurate, dibutyltin malate, dibutyltin bis(benzylmalate), dibutyltin bis(2-ethylhexylmalate), di-n-octyltin diacetate, di-n-octyltin di-n-octanoate, di-n-octyltin di-2-ethylhexanoate, di-n-octyltin dilaurate, di-n-octyltin malate, di-n-octyltin bis(benzylmalate) and di-n-octyltin bis(2-ethylhexylmalate).

The amount of this condensation accelerator used, expressed as the ratio of the number of moles of the above compound to the total number of moles of alkoxysilyl groups present in the reaction system, is preferably at least 0.1, and more preferably at least 0.5, but preferably not more than 10, and more preferably not more than 5. At a molar ratio below 0.1, the condensation reaction may not proceed to a sufficient degree. On the other hand, at a molar ratio greater than 10, further effects by the condensation accelerator may not be achievable.

The above condensation reaction is carried out in an aqueous solution. It is recommended that the condensation reaction be carried out at a temperature of preferably at least 85° C., more preferably at least 100° C., and even more preferably at least 110° C. but preferably not more than 180° C., even more preferably not more than 170° C., and even more preferably not more than 150° C. The aqueous solution has a pH of preferably at least 9, and more preferably at least 10, but preferably not more than 14, and more preferably not more than 12. At a condensation reaction temperature of less than 85° C., the condensation reaction proceeds slowly and may be unable to reach completion, as a result of which the modified polybutadiene obtained may be subject to deterioration over time. On the other hand, at a temperature above 180° C., polymer aging reactions proceed, which may diminish the physical properties.

If the aqueous solution during the condensation reaction has a pH below 9, the condensation reaction will proceed slowly and may be unable to reach completion, as a result of which the modified polybutadiene obtained may be subject to deterioration over time. On the other hand, if the aqueous solution during the condensation reaction has a pH above 14, a large amount of alkali-derived components will remain within the modified polybutadiene following isolation and may be difficult to remove.

The condensation reaction is carried out for a period of preferably at least 5 minutes, and more preferably at least 15 minutes, but preferably not more than 10 hours, and more preferably not more than 5 hours. At less than 5 minutes, the condensation reaction may not go to completion. On the other hand, carrying out the condensation reaction for more than 10 hours may not yield any additional effects.

The pressure of the reaction system at the time of the condensation reaction is preferably at least 0.01 MPa, and more preferably at least 0.05 MPa, but preferably not more than 20 MPa, and more preferably not more than 10 MPa.

The condensation reaction is not subject to any particular limitation, and may be carried out in a batch-type reactor or in a continuous reaction system using an apparatus such as a multi-stage continuous reactor. Also, the condensation reaction and solvent removal may be carried out at the same time.

Following the above condensation reaction, the target modified polybutadiene may be obtained by carrying out a conventional work-up.

The modified polybutadiene of the invention has a Mooney viscosity ($ML_{1+4}$, 100° C.) which, while not subject to any particular limitation, is preferably at least 10, more preferably at least 15, and even more preferably at least 20, but preferably not more than 100, and more preferably not more than 80. At a low Mooney viscosity, the composition tends to have a poor resilience when rendered into a golf ball. On the other hand, at a high Mooney viscosity, the golf ball manufacturability may be poor. The Mooney viscosity is the $ML_{1+4}$, (100° C.) value measured in accordance with ASTM D-1646-96.

The amount of modified polybutadiene serving as ingredient A in the masterbatch, assuming the combined amount of ingredients A and B to be 100 wt %, is at least 20 wt %, preferably at least 30 wt %, and more preferably at least 50 wt %. The upper limit is 100 wt % or less, preferably 90 wt % or less, and more preferably 80 wt % or less. At less than 20 wt %, a rubber composition having the desired properties is difficult to obtain, as a result of which the objects of the invention are not attainable.

The modified polybutadiene used in the invention may be of a single type or may be a combination of two or more types.

Examples of the other rubber ingredient (B) which is used together with the modified polybutadiene include diene rubbers such as natural rubbers, synthetic isoprene rubbers, polybutadiene rubbers other than above ingredient A, styrene-butadiene rubbers, ethylene-α-olefin copolymer rubbers, ethylene-α-olefin-diene copolymer rubbers and acrylonitrile-butadiene copolymer rubbers. The diene rubber used in the invention may be of a single type or may be a combination of two or more types. A portion of the diene rubber may have a branched structure obtained using a polyfunctional modifier such as tin tetrachloride or silicon tetrachloride. Of the above, cis-1,4-polybutadiene is preferred. The polymerization catalyst is not subject to any particular limitation, although it is preferable to employ a product obtained by polymerization using a group VIII catalyst system or the above-described rare-earth catalyst system. Illustrative examples of commercial products that may be used for this purpose include those manufactured by JSR Corporation under the trade names BR01, BR51 and BR730. The amount of diene rubber serving as ingredient B in the masterbatch, assuming the combined amount of ingredients A and B to be 100 wt %, is 0 wt % or more, preferably 10 wt % or more, more preferably 20 wt % or more, and even more preferably 50 wt % or more. The upper limit is not more than 80 wt %, and preferably not more than 70 wt %.

No particular limitation is imposed on the Mooney viscosity of ingredient B. However, when a plurality of types are used, at least one of those types has a Mooney viscosity of preferably at least 30, more preferably at least 40, and even more preferably at least 50, but preferably not more than 100, more preferably not more than 80, and even more preferably not more than 70. If this value is too small, the rebound may decrease. On the other hand, if this value exceeds the above range, the golf ball manufacturability may worsen.

The unsaturated carboxylic acid and/or metal salt thereof included as above ingredient C is exemplified by α,β-ethylenically unsaturated carboxylic acids and monovalent or divalent metal salts of α,β-ethylenically unsaturated carboxylic acids. Specific examples of compounds that may be used include any one or combinations of two or more of the following:
(i) acrylic acid, methacrylic acid, itaconic acid, maleic acid, fumaric acid, crotonic acid, sorbic acid, tiglic acid, cinnamic acid and aconitic acid;
(ii) zinc, magnesium, calcium, barium, and sodium salts of the unsaturated acids in (i) above, such as zinc acrylate, zinc diacrylate, zinc methacrylate, zinc dimethacrylate, zinc itaconate, magnesium acrylate, magnesium diacrylate, magnesium methacrylate, magnesium dimethacrylate and magnesium itaconate.

The metal salt of an aα,β-ethylenically unsaturated carboxylic acid serving as ingredient C may be directly mixed with the base rubber and other ingredients by a conventional method. Alternatively, an α,β-ethylenically unsaturated carboxylic acid such as acrylic acid or methacrylic acid may be added and worked into a masterbatch in which a metal oxide such as zinc oxide has already been incorporated, and the α,β-ethylenically unsaturated carboxylic acid and the metal oxide thereby made to react within the rubber composition so as to form a metal salt of the α,β-ethylenically unsaturated carboxylic acid. The crosslinking agent used may be of a single type or a combination of two or more types.

Next, with regard to the amounts in which the various ingredients are included when preparing the masterbatch of an unsaturated carboxylic acid and/or a metal salt thereof, the respective ingredients are adjusted to suitable amounts such that the amount of the ingredient C included per 100 parts by weight of rubber ingredients A and B is preferably at least 20 parts by weight, and more preferably at least 50 parts by weight. At less than 20 parts by weight, it may not be possible to attain the objects of the invention. The upper limit in the amount of ingredient C included is preferably not more than 400 parts by weight, more preferably not more than 300 parts by weight, and even more preferably not more than 200 parts by weight. At more than 400 parts by weight, the masterbatch may be difficult to prepare.

In the present invention, the rubber composition is prepared using this masterbatch. In addition to aforementioned ingredients A and B in the masterbatch, other rubbers may be optionally included in the rubber composition. Alternatively, it is possible to use ingredient A alone or a mixture of ingredients A and B as the rubber ingredients in the masterbatch, and to subsequently blend ingredient B in the masterbatch so as to obtain a base rubber for the golf ball-forming rubber composition.

Conditions during preparation of the masterbatch, while not subject to any particular limitation, are preferably as follows. Using a closed mixer such as a pressure kneader, the unsaturated carboxylic acid and/or metal salt thereof is added all at once or in a plurality of divided portions to the rubber material. Once the maximum temperature attained by the masterbatch has exceeded 115° C., mixing is carried out for another 1 to 10 minutes.

When the rubber composition is prepared from the masterbatch, the proportion of the overall rubber composition accounted for by the masterbatch, while not subject to any particular limitation, is preferably not more than 80 wt %, and more preferably not more than 50 wt %, but is preferably at least 5 wt %, and more preferably at least 10 wt %.

In the golf ball manufacturing method of the present invention, as described above, ingredient C is mixed with the rubber ingredients by a masterbatching technique, following which the rubber composition ultimately desired is prepared using the masterbatch. Above-described ingredients A, B and C are included in the rubber composition as essential ingredients, although it is possible to also include suitable amounts of (D) an inorganic filler and (E) an organic peroxide. It is particularly desirable for the amounts of the respective ingredients to be adjusted so that the rubber composition contains, per 100 parts by weight of the rubber ingredients—including ingredients A and B, from 10 to 50 parts by weight of (C) the unsaturated carboxylic acid and/or metal salt thereof, from 5 to 80 parts by weight of (D) the inorganic filler, and from 1 to 10 parts by weight of (E) the organic peroxide. Ingredients D and E are described more fully below.

The inorganic filler D is included to reinforce the crosslinked rubber and thereby increase its strength. The weight of the golf ball can be suitably adjusted by the amount of such addition. Illustrative examples of the inorganic filler include zinc oxide, barium sulfate, silica, alumina, aluminum sulfate, calcium carbonate, aluminum silicate and magnesium silicate. Of these, the use of zinc oxide, barium sulfate or silica is preferred. These inorganic fillers may be used singly or as combinations of two or more thereof. The amount of inorganic filler added per 100 parts by weight of the rubber ingredients is at least 5 parts by weight, and preferably at least 8 parts by weight, but not more than 80 parts by weight, and preferably not more than 70 parts by weight. At less than 5 parts by weight, the solid golf balls obtained will be too light.

On the other hand, at more than 80 parts by weight, the solid golf balls obtained will be too heavy.

The organic peroxide used as ingredient E serves as an initiator for crosslinking reactions between the rubber ingredients and the crosslinking agent, and for grafting reactions, polymerization reactions and the like. Specific examples of the organic peroxide include dicumyl peroxide, 1,1-bis(t-butylperoxy)-3,3,5-trimethylcyclohexane, 2,5-dimethyl-2,5-di-(t-butylperoxy)hexane and 1,3-bis(t-butylperoxyisopropyl)benzene. The organic peroxide is included in an amount, per 100 parts by weight of the rubber ingredients, of at least 0.1 part by weight, and preferably 0.2 part by weight, but not more than 10 parts by weight, and preferably not more than 5 parts by weight. At less than 0.1 part by weight, the molded material may be too soft, lowering the rebound resilience. On the other hand, at more than 10 parts by weight, the molded material may be too hard, resulting in a poor durability.

To further improve resilience in the present invention, it is preferable to include also an organosulfur compound. Specifically, it is recommended that an organosulfur compound such as a thiophenol, thionaphthol, halogenated thiophenol, or a metal salt of any of these be included. Suitable examples of such compounds include pentachlorothiophenol, pentafluorothiophenol, pentabromothiophenol, p-chlorothiophenol, zinc salts of pentachlorothiophenol, etc.; and diphenylpolysulfides, dibenzylpolysulfides, dibenzoylpolysulfides, dibenzothiazoylpolysulfides and dithiobenzoylpolysulfides having 2 to 4 sulfurs. Diphenyldisulfide and the zinc salt of pentachlorothiophenol are especially preferred.

The amount of the organosulfur compound included per 100 parts by weight of the base rubber is preferably at least 0.1 part by weight, more preferably at least 0.2 part by weight, and even more preferably at least 0.5 part by weight, but preferably not more than 5 parts by weight, more preferably not more than 4 parts by weight, even more preferably not more than 3 parts by weight, and most preferably not more than 2 parts by weight. If too much organosulfur compound is included, the molded material may be too soft. On the other hand, if too little is included, an increase in the resilience is unlikely to be achieved.

In addition to the above-mentioned ingredients, the rubber composition of the invention may also optionally include lubricants such as stearic acid, antioxidants, and other additives.

The material molded under heat from a rubber composition in the invention can be obtained by vulcanizing and curing the above-described rubber composition using a method of the same type as that used on prior-art rubber compositions for golf balls. Vulcanization may be carried out, for example, at a temperature of from 100 to 200° C. for a period of from 10 to 40 minutes.

It is recommended that the material molded under heat from a rubber composition in the invention have a hardness difference, obtained by subtracting the JIS-C hardness at the center of the hot-molded material from the JIS-C hardness at the surface of the hot-molded material, of at least 15, preferably at least 16, more preferably at least 17, and even more preferably at least 18, but not more than 50, and preferably not more than 40. Setting the hardness difference within this range is desirable for achieving a golf ball having a combination of a soft feel and a good rebound and durability.

Regardless of which of the subsequently described golf balls in which it is employed, it is recommended that the material molded under heat from a rubber composition in the present invention have a deflection, when compressed under a final load of 1,275 N (130 kgf) from an initial load state of 98 N (10 kgf), of at least 2.0 mm, preferably at least 2.5 mm, and more preferably at least 2.8 mm, but not more than 6.0 mm, preferably not more than 5.5 mm, more preferably not more than 5.0 mm, and most preferably not more than 4.5 mm. Too small a deflection may worsen the feel on impact and, particularly on long shots such as with a driver in which the ball incurs a large deformation, may subject the ball to an excessive rise in the spin rate, shortening the distance traveled by the ball. On the other hand, a molded material that is too soft may deaden the feel of the ball when played and compromise the rebound, resulting in a shorter distance, and may give the ball a poor durability to cracking on repeated impact.

The golf ball obtained by the manufacturing method of the invention includes the above-described hot-molded material as a ball component, but the construction of the ball is not subject to any particular limitation. Examples of suitable golf ball constructions include one-piece golf balls in which the hot-molded material serves directly as the golf ball, solid two-piece golf balls wherein the hot-molded material serves as a solid core on the surface of which a cover has been formed, solid multi-piece golf balls made of three or more pieces in which the hot-molded material serves as a solid core on the outside of which a cover of two or more layers has been formed, thread-wound golf balls in which the hot-molded material serves as the center core, and multi-piece golf balls in which the hot-molded material serves as an intermediate layer or outermost layer that encloses a solid core. Solid two-piece golf balls and solid multi-piece golf balls in which the hot-molded material serves as a solid core are preferred because such golf ball constructions are able to exploit most effectively the characteristics of the hot-molded material.

In the practice of the invention, when the hot-molded material is used as a solid core, it is recommended that the solid core have a diameter of at least 30.0 mm, preferably at least 32.0 mm, more preferably at least 35.0 mm, and most preferably at least 37.0 mm, but not more than 41.0 mm, preferably not more than 40.5 mm, more preferably not more than 40.0 mm, and most preferably not more than 39.5 mm.

In particular, it is recommended that such a solid core in a solid two-piece golf ball have a diameter of at least 37.0 mm, preferably at least 37.5 mm, more preferably at least 38.0 mm, and most preferably at least 38.5 mm, but not more than 41.0 mm, preferably not more than 40.5 mm, and more preferably not more than 40.0 mm.

It is recommended that such a solid core in a solid three-piece golf ball have a diameter of at least 30.0 mm, preferably at least 32.0 mm, more preferably at least 34.0 mm, and most preferably at least 35.0 mm, but not more than 40.0 mm, preferably not more than 39.5 mm, and more preferably not more than 39.0 mm.

It is also recommended that the solid core have a specific gravity of at least 0.9, preferably at least 1.0, and more preferably at least 1.1, but not more than 1.4, preferably not more than 1.3, and more preferably not more than 1.2.

When the hot-molded material of the invention is used as a core to form a solid two-piece golf ball or a solid multi-piece golf ball, known cover materials and intermediate layer materials may be used. Exemplary cover materials and intermediate layer materials include thermoplastic or thermoset polyurethane elastomers, polyester elastomers, ionomer resins, polyolefin elastomers, and mixtures thereof. The use of thermoplastic polyurethane elastomers and ionomer resins is especially preferred. These may be used singly or as combinations of two or more thereof. Alternatively, when a golf ball is formed with the hot-molded material in the invention serving as an intermediate layer or outermost layer enclosing a solid core, use may be made of known core materials, intermediate layer materials and cover materials.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080, Pandex T8295 and Pandex T8290 (all manufactured by DIC Bayer Polymer, Ltd.). When an ionomer resin is used, illustrative examples of suitable commercial ionomer resins include Surlyn 6320 and Surlyn 8120 (both products of E.I. DuPont de Nemours and Co., Inc.), and Himilan 1706, Himilan 1605, Himilan 1855, Himilan 1601 and Himilan 1557 (all products of DuPont-Mitsui Polychemicals Co., Ltd.).

The cover material may include also, as an optional ingredient, a polymer other than the foregoing thermoplastic elastomers. Specific examples of polymers that may be included as optional ingredients include polyamide elastomers, styrene block elastomers, hydrogenated polybutadienes and ethylene-vinyl acetate (EVA) copolymers.

The above-described solid two-piece golf balls and solid multi-piece golf balls may be manufactured by a known method. When producing solid two-piece and multi-piece golf balls, preferred use may be made of a known method wherein the hot-molded material is placed as the solid core within a particular injection-molding mold, following which a cover material is injected over the core to form a solid two-piece golf ball, or an intermediate layer material and a cover material are injected in this order over the core to form a solid multi-piece golf ball. In some cases, production may be carried out by molding the above-described cover material under applied pressure.

It is recommended that the intermediate layer of the above solid multi-piece golf ball have a thickness of at least 0.5 mm, and preferably at least 1.0 mm, but not more than 3.0 mm, preferably not more than 2.5 mm, more preferably not more than 2.0 mm, and most preferably not more than 1.6 mm.

It is also recommended that the cover have a thickness, whether in a solid two-piece golf ball or a solid multi-piece golf ball, of at least 0.7 mm, and preferably at least 1.0 mm, but not more than 3.0 mm, preferably not more than 2.5 mm, more preferably not more than 2.0 mm, and most preferably not more than 1.6 mm.

The golf ball obtained by the manufacturing method of the invention has dimples formed thereon and may be manufactured for competitive use by imparting the ball with a diameter and weight which conform with the Rules of Golf; that is, a diameter of at least 42.67 mm and a weight of not more than 45.93 g. It is recommended that the diameter be preferably not more than 44.0 mm, more preferably not more than 43.5 mm, and most preferably not more than 43.0 mm; and that the weight be preferably at least 44.5 g, more preferably at least 45.0 g, even more preferably at least 45.1 g, and most preferably at least 45.2 g.

As explained above, in the inventive manufacturing method, by employing the masterbatch which contains an unsaturated carboxylic acid and/or a metal salt thereof and is obtained using a modified polybutadiene rubber (ingredient A), the dispersibility of the unsaturated carboxylic acid and/or metal salt thereof (ingredient C) in the rubber composition is improved, enabling the resilience and durability of a rubber molded material obtained therefrom to be further enhanced. Therefore, the present invention is an industrially beneficial method for manufacturing golf balls.

EXAMPLES

The following Synthesis Examples, Examples of the invention and Comparative Examples are provided by way of illustration and not by way of limitation.

Synthesis Example 1

Preparation of Modified Polymer I

A five-liter autoclave was flushed with nitrogen, following which 2.22 kg of cyclohexane and 280 g of 3-butadiene were added under a nitrogen atmosphere. To these was then added a catalyst prepared beforehand by reacting and aging at 50° C. for 30 minutes the following catalyst ingredients: a cyclohexane solution containing 0.081 mmol of neodymium versatate, a toluene solution containing 1.68 mmol of methyl alumoxane (abbreviated below as "MAO"), a toluene solution containing 4.67 mmol of diisobutylaluminum hydride ("DIBAH") and 0.168 mmol of diethylaluminum chloride, and 4.20 mmol of 1,3-butadiene. Following catalyst addition, polymerization was carried out at 80° C. for 60 minutes. Conversion of the 1,3-butadiene was substantially 100%.

In addition, while holding the polymer solution at a temperature of 60° C., a toluene solution containing 2.5 mmol of 3-glycidoxypropyltrimethoxysilane ("GPMOS") was added and the reaction was effected for 30 minutes. A toluene solution containing 13 mmol of tetraisopropyl titanate ("IPOTi") was then added and mixing was carried out for 30 minutes. This was followed by the addition of a methanol solution containing 1.5 g of 2,4-di-tert-butyl-p-cresol, yielding 2.5 kg of a modified polymer solution.

Next, the above modified polymer solution was added to 20 liters of an aqueous solution adjusted to pH 10 with sodium hydroxide, after which a condensation reaction was carried out together with solvent removal for 2 hours at 110° C., followed by drying on a 110° C. roller, thereby yielding a modified polymer. The modified polymer had a Mooney viscosity of 32, a cis-1,4 bond content of 92.0%. and a 1,2-vinyl content of 1.0%.

Synthesis Example 2

Preparation of Modified Polymer II

Aside from using 10 mmol of bis(2-ethylhexanoate)tin (EHASn) instead of IPOTi, a modified polymer was obtained by charging the same composition and using the same polymerization method as in Synthesis Example 1. The modified polymer had a Mooney viscosity of 39, a cis-1,4 bond content of 92.0%, and a 1,2-vinyl content of 1.0%.

Golf ball cores were produced in the following examples of the invention and comparative examples using the modified polymers I and II synthesized in the above synthesis examples. The cores are shown in Table 1.

Examples 1 to 3, and Comparative Examples 1 and 2

Preparation of Masterbatches a, b and c

Masterbatches a, b and c were prepared by using a kneader to mix the ingredients shown in Table 1 below. Next, using the masterbatches, rubber compositions were prepared by masticating with a kneader the starting materials in the formulations shown in Table 2 below, then were vulcanized in a spherical mold at 170° C. for 20 minutes, thereby giving 37.7 mm diameter spherical moldings weighing 32 g. The physical properties of the moldings thus obtained were evaluated. The results are presented in Table 2 below.

TABLE 1

| Masterbatch | a | b | c |
|---|---|---|---|
| BR01 | 50 | 50 | 100 |
| Polymer I | 50 | — | — |
| Polymer II | — | 50 | — |
| ZDA | 150 | 150 | 150 |

Note:
Numbers shown above for the rubber compositions indicate parts by weight.

TABLE 2

| | | Example | | | Comparative Example | |
|---|---|---|---|---|---|---|
| | | 1 | 2 | 3 | 1 | 2 |
| Rubber compositions | Masterbatch a | 45 | | 45 | | |
| | Masterbatch b | | 45 | | | |
| | Masterbatch c | | | | 45 | |
| | Polymer I | | | | | 9 |
| | BR01 | 82 | 82 | 82 | 82 | 91 |
| | ZDA | | | | | 27 |
| | ZnO | 18.3 | 18.3 | 18.3 | 18.3 | 18.3 |
| | Antioxidant | 0.2 | 0.2 | 0.2 | 0.2 | 0.2 |
| | PO-D | 0.4 | 0.4 | 0.4 | 0.4 | 0.4 |
| | ZnPCTP | | | 0.1 | | |
| Deformation under loading (10-130 kgf) | | 4.2 | 4.1 | 4.3 | 4.3 | 4.3 |
| Durability index | | 130 | 135 | 125 | 100 | 120 |
| Rebound index | | 100.5 | 100.6 | 100.7 | 100 | 100.3 |

Notes:
Numbers shown above for the rubber compositions indicate parts by weight.
The amount of rubber ingredients in each example was 100 parts by weight.

BR01: A polybutadiene produced by JSR Corporation (polymerized with a nickel catalyst). Mooney viscosity, 44.
ZDA: Zinc diacrylate manufactured by Nippon Shokubai Co., Ltd. under the trade name ZN-DA85S.
ZnO: Grade 3 zinc oxide available from Sakai Chemical Industry Co., Ltd.
Antioxidant: Manufactured by Ouchi Shinko Chemical Industry Co., Ltd. under the trade name Nocrac NS-6.
PO-D: Dicumyl peroxide produced by NOF Corporation under the trade name Percumyl D.
ZnPCTP: Zinc salt of pentachlorothiophenol.
Load Deformation
The deflection (mm) by the spherical molding when compressed under a final load of 1,275 N (130 kgf) from an initial load state of 98 N (10 kgf) was determined.
Rebound Index
The initial velocity was measured with an initial velocity measuring apparatus of the same type as that of the United States Golf Association (USGA)—the official golf ball regulating body. The results are expressed as values relative to a value of "100" for the result obtained in Comparative Example 1.
Durability Index
The durability of the spherical molding was evaluated using an ADC Ball COR Durability Tester produced by Automated Design Corporation (U.S.). This tester functions so as to fire a spherical molding using air pressure and cause it to repeatedly strike two metal plates arranged in parallel. The average number of shots required for the spherical molding to crack was treated as its durability. The incident velocity against the metal plates was 30 m/s. The results are expressed as values relative to a value of "100" for the result obtained in Comparative Example 1.

As is apparent from the results in Table 2, the golf balls of Examples 1 to 3 of the invention had better rebounds and durabilities than the golf balls of Comparative Examples 1 and 2.

The invention claimed is:

1. A method of manufacturing a golf ball, comprising:
    (i) pre-preparing a masterbatch of an unsaturated carboxylic acid and/or a metal salt thereof by mixing an unsaturated carboxylic acid and/or a metal salt thereof with a rubber material,
    (ii) preparing a rubber composition comprising the masterbatch of the unsaturated carboxylic acid and/or a metal salt thereof, and
    (iii) employing a material obtained by molding the rubber composition under heat as a golf ball component,
    wherein the masterbatch comprises:
    (A) from 20 to 80 wt % of a modified polybutadiene obtained by a modification reaction wherein a polybutadiene having a vinyl content of from 0 to 2%, a cis-1,4 bond content of at least 80% and an active end is modified at the active end with at least one type of alkoxysilane compound,
    (B) from 80 to 20 wt % of a diene rubber other than ingredient A,
    such that ingredients A and B are included in a combined amount of 100 wt %, and
    (C) an unsaturated carboxylic acid and/or a metal salt thereof,
    wherein ingredient C is included in the masterbatch of an unsaturated carboxylic acid and/or a metal salt thereof in an amount of at least 150 parts by weight but not more than 200 parts by weight per 100 parts by weight of rubber ingredients A and B, and wherein the masterbatch is blended with a rubber consisting of the same diene rubber as ingredient B in the step (ii) of preparing the rubber composition.

2. The golf ball manufacturing method of claim 1, wherein the rubber composition further comprises an organosulfur compound.

3. The golf ball manufacturing method of claim 1, wherein the rubber composition further comprises, per 100 parts by weight of rubber ingredients therein:
    (D) from 5 to 80 parts by weight of an inorganic filler, and
    (E) from 0.1 to 10 parts by weight of an organic peroxide.

4. The golf ball manufacturing method of claim 1, wherein the alkoxysilane compound has an epoxy group on the molecule.

5. The golf ball manufacturing method of claim 1, wherein an organotin compound and/or an organotitanium compound is added as a condensation accelerator during and/or following completion of a step in which the polybutadiene modification reaction is carried out.

6. The golf ball manufacturing method of claim 1, wherein the polybutadiene used to prepare ingredient A is polymerized using a rare-earth element-containing catalyst system.

7. The golf ball manufacturing method of claim 5, wherein the condensation accelerator is a tin carboxylate and/or a titanium alkoxide.

* * * * *